US012465992B2

(12) United States Patent
Hutchison et al.

(10) Patent No.: US 12,465,992 B2
(45) Date of Patent: Nov. 11, 2025

(54) SYSTEMS AND METHODS FOR CONTROLLED ARC AND SHORT PHASE TIME ADJUSTMENT

(71) Applicant: Illinois Tool Works Inc., Glenview, IL (US)

(72) Inventors: Richard M. Hutchison, Iola, WI (US); Dustin Wagner, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/737,587

(22) Filed: Jan. 8, 2020

(65) Prior Publication Data
US 2020/0246902 A1    Aug. 6, 2020

Related U.S. Application Data

(60) Provisional application No. 62/799,342, filed on Jan. 31, 2019.

(51) Int. Cl.
*B23K 9/09*     (2006.01)
*B23K 9/095*    (2006.01)
(Continued)

(52) U.S. Cl.
CPC .......... *B23K 9/0953* (2013.01); *B23K 9/0956* (2013.01); *B23K 9/125* (2013.01); *B23K 9/133* (2013.01)

(58) Field of Classification Search
CPC ....... B23K 9/125; B23K 9/133; B23K 9/0953
See application file for complete search history.

(56) References Cited

U.S. PATENT DOCUMENTS 11,370,050 B2 *  6/2022  Davidson ................ B23K 9/06
2004/0222204 A1 * 11/2004  Hutchison .............. B23K 9/091
                                                219/130.21
(Continued)

FOREIGN PATENT DOCUMENTS

CN    1380157    11/2002
CN    1478627     3/2004
(Continued)

OTHER PUBLICATIONS

Canadian Office Action Appln. No. 3,068,228 dated Apr. 16, 2021.

*Primary Examiner* — Ibrahime A Abraham
*Assistant Examiner* — Lawrence H Samuels
(74) *Attorney, Agent, or Firm* — McAndrews, Held & Malloy, Ltd.

(57) ABSTRACT

A welding-type system includes a welding-type power supply configured to generate output power for an arc welding process and a controller. The controller calculates a representative duration of a plurality of short circuit events and/or arc events during the arc welding process. Each short circuit event and/or arc event comprises a transitional phase, an intermediate phase, and an end phase. The controller calculates a sum of a duration of the transitional phase, a duration of the intermediate phase, and a duration of a ramp down time from a target current of the intermediate phase to a target current of the end phase associated with a given short circuit or arc event. The controller controls the welding-type power supply to adjust a duration of the transitional phase, the intermediate phase or the ramp down time associated with the given short circuit event such that the sum is within the threshold range of the representative duration. Additionally or alternatively, the controller maintain a duration of the end phase less than a predetermined value.

20 Claims, 6 Drawing Sheets

(51) Int. Cl.
*B23K 9/12* (2006.01)
*B23K 9/133* (2006.01)

(56) References Cited

U.S. PATENT DOCUMENTS

| | | | |
|---|---|---|---|
| 2005/0084039 A1 | 4/2005 | Stava | |
| 2006/0138115 A1 | 6/2006 | Norrish | |
| 2008/0128395 A1 | 6/2008 | Aigner | |
| 2014/0027423 A1* | 1/2014 | Takada | H05B 1/0202 |
| | | | 219/130.01 |
| 2014/0158669 A1* | 6/2014 | Davidson | B23K 9/1012 |
| | | | 219/130.5 |
| 2015/0375331 A1* | 12/2015 | Hutchison | B23K 9/09 |
| | | | 219/136 |
| 2016/0144444 A1* | 5/2016 | Davidson | B23K 9/0956 |
| | | | 219/130.51 |
| 2016/0167151 A1* | 6/2016 | Mehn | B23K 9/1062 |
| | | | 219/130.21 |
| 2016/0288235 A1* | 10/2016 | Davidson | B23K 9/092 |
| 2017/0008115 A1* | 1/2017 | Ide | B23K 9/073 |
| 2017/0015162 A1 | 1/2017 | Klegin et al. | |

FOREIGN PATENT DOCUMENTS

| | | |
|---|---|---|
| CN | 101072655 | 11/2007 |
| CN | 101296773 | 10/2008 |
| CN | 101421068 | 4/2009 |
| CN | 104023893 | 9/2014 |

\* cited by examiner

SYSTEMS AND METHODS FOR CONTROLLED ARC AND SHORT PHASE TIME ADJUSTMENT

CROSS REFERENCE TO RELATED APPLICATIONS

This application is a Non-Provisional Patent Application of U.S. Provisional Patent Application No. 62/799,342 entitled "Systems and Methods for Controlled Arc and Short Phase Time Adjustment" filed Jan. 31, 2019, which is herein incorporated by reference in its entirety.

BACKGROUND

Welding is a process that has become ubiquitous in all industries. Conventional systems and methods for joining processes, such as welding, brazing, adhesive bonding, and/or other joining operations, require substantial investments in equipment, such as processing, displays, practice workpieces, welding tool(s), sensor(s), and/or other equipment.

Conventional short circuit gas metal arc welding (GMAW), also referred to as metal inert gas (MIG) welding, is a welding process in which an electric arc forms between an electrode and pieces of metal that are to be welded. The electric arc generates heat that causes the pieces of metal to melt. Upon cooling down of the melted pieces of metal, the pieces of metal join and form a weld. Electrical and/or physical parameters can be measured and the results of these measurements may be provided to the welder and/or to a control system and control circuit as process and system feedback during the welding operation. The welder and/or the control system and the control circuit may use this feedback information to adjust the welding parameters in real time while welding thus causing in an improvement in the welding process.

Advanced forms of MIG welding are based upon generation of cyclic pulses that may cause controlled short circuits between the advancing wire electrode and the weld puddle including melted metal of the workpieces and the wire electrode. That is, various pulsed regimes may be carried out in which current and/or voltage pulses are commanded by the power supply control circuitry to regulate the formation and deposition of metal droplets (and/or spray, and/or globules) from the welding wire, to sustain a desired heating and cooling profile of the weld puddle, to control short circuits between the wire and the weld puddle, and so forth.

While effective in many applications, such pulsed and short circuit welding regimes may be subject to drawbacks. For example, depending upon the transfer mode, the processes may either limit travel speed, create excessive spatter requiring timely cleanup of welded workpieces, provide less than optimal penetration, or any combination of these and other effects. Moreover, certain pulsed processes, such as ones operating in a spray mode of material transfer, may run excessively hot for particular applications. Others, such as short circuit processes, may run cooler, but may again produce spatter and other unwanted weld effects.

Moreover, in certain welding situations and with certain welding electrodes, pulsed welding processes that are trained to implement cyclic short circuits between the electrode and the workpiece may add excessive energy to the weld. For example, with cored wire electrodes, the electrode may be heated by excessive current added to the wire, particularly insomuch as the weld current tends to flow through the wire sheath, which can more easily melt than solid wires. As a result, the arc may flare (i.e. grow long). However, for spanning gaps, reducing burn-through, and increasing travel speeds, it may be desirable to maintain the arc length at a minimum. Unfortunately, this causes the wire to short to the progressing weld puddle and requires additional current to clear short circuits, again leading to heating of cored wire sheaths, and causing the arc to flare, using a large power source to generate high power outputs.

There is a need, therefore, for improved welding strategies that allow for welding in pulsed and short circuit waveform regimes while improving weld quality and flexibility.

SUMMARY

The present disclosure relates generally to welders, and more particularly to a welder configured to control a short circuit event of an arc welding operation by adjusting a duration and/or current associated with one or more phases of the short circuit event or an arc event. As a result, the controlled short circuit generates reduced spatter and lower currents compared to conventional systems.

In accordance with an exemplary implementation, a welding method includes generating a control waveform for welding power output, the waveform including a plurality of successive peak phases followed by a short circuit between a weld puddle and an advancing wire electrode; and adjusting a duration of each present peak phase based upon at least a duration of one or more phases of an immediately preceding short circuit event to control the short circuit that will occur following the then present peak phase.

In some examples, the methods and systems allow for regulating at least one waveform phase based upon at least the immediately preceding short circuit to control the next short circuit that will occur, and/or regulating at least one short response phase based upon at least the immediately preceding short circuit to control the next short circuit that will occur.

DETAILED DESCRIPTION

The present disclosure describes systems and methods for controlled short circuit by time adjustments of one or more phases of an arc event, a short circuit event, or a combination of both events. The time adjustments can be based on a representative (e.g., average) duration of an arc event and/or a short event, to control the short clearance to occur at a desired current level.

For example, a short clearing prediction can be based on a process feedback variable. If the current level is not decreased sufficiently prior to the short clearing event, the higher current level can result in spatter. To reduce the amount of spatter, the duration of one or more phases of the short circuit event can be adjusted such that the current is at the desired value when the short clears.

In some examples, the target current level in one or more phases of the short circuit can be adjusted. When the target peak current of a preceding phase is reduced, the ramp down time to a target threshold current in a subsequent phase is shortened. The result is the short circuit clearance event occurs at the target current, and not at a current level between the target peak current and the threshold current.

In some disclosed examples, the duration of a short circuit event can be described with respect to three or more distinct phases: a transitional phase, an intermediate phase, and an ending phase. Each phase has an independently determined target current, current ramp rate, and/or duration. Additionally, or alternatively, each phase can have an independently determined target wire feed speed (WFS) and WFS ramp rate, which regulates the speed and/or acceleration of the wire as it advances and/or retracts to and/or from a workpiece.

If the duration of the short circuit is less than the sum of the duration of the transitional phase, the intermediate phase, and the time required to reduce the current from the peak current level to the background current level, the short clearance event occurs at a current value higher than the desired, background current level. The inconsistent timing of the short circuit clearance, and associated current levels, can have an adverse effect on the stability of the welding process.

To avoid the short circuit clearance occurring at a current level above the background level, the controller can employ a representative short circuit clearance event duration (e.g., an average) to adjust one or more characteristics (e.g., duration, current levels) of the short circuit phases to avoid clearance of the short circuit before the background current is achieved.

A short circuit cycle alternates between a short circuit event and an arc event. In a manner consistent with the description of a short circuit control, the arc event can be adjusted to control the short circuit clearance occurrence. For example, it is desirable for the molten droplet from the welding wire to enter the weld puddle at a relatively low current level during a MIG welding process. If the current level is too high, the normal "wetting" action between the droplet and the puddle is interrupted by a high Lorentz "pinch" force at the droplet/puddle interface. This interruption of the droplet transfer process can result in large spatter droplets being expelled by the process.

To avoid such unnecessary spatter, phases of the arc event are set such that a predetermined current level is reached prior to the short circuit event. In particular, the phases of the arc event have the same independently adjustable parameters as described with respect to the short circuit phases. For example, the current levels can be reduced much more quickly during the arc phases, as higher voltage is available during the arc phases to drive energy from the output inductor.

Thus, in a manner similar to the one described with respect to the short circuit event, the arc event can be adjusted in accordance with a control scheme implemented by the controller.

The controller is configured to calculate a sum of a duration of the transitional phase, a duration of the intermediate phase, and a duration of the ramp down time from a peak, target current level of the intermediate phase to a target, background current level of the end phase, at which time a short circuit event occurs.

The controller is configured to control the power supply to adjust a characteristic of one of the transitional phase, the intermediate phase, or the ramp down time such that the sum is less than the representative duration. As stated, the current levels (e.g., peak and background current levels) can also be adjusted to reduce the current decay time, to similar effect. The adjustment can be made to the duration and/or target current level of any or all of the phases associated with the short circuit event.

Additionally, or alternatively, the current levels (e.g., peak and/or background current levels) can be adjusted to reduce the current decay time, to similar effect. The adjustment can be made to the duration and/or target current level of any or all of the phases associated with the arc event.

Additionally, or alternatively, the phase current and time parameters could be fixed, and the wire feed speed can be adjusted to alter the durations of one or more of the phases associated with the short circuit event and/or the arc event.

Employing the systems and methods describe herein serve to increase arc welding process stability, decrease spatter generation during welding. The resulting process is more responsive to dynamically changing process variables, such as contact tip to work distance (CTWD), welding torch travel speed, welding torch angle, workpiece material thickness, joint configuration, among other variables.

Depending on the welding process being performed, it can be desirable to heat the wire (e.g., by a joule heating effect) by current flowing through the weld wire. Accordingly, the average short circuit current needs to be at an elevated level. Thus, to maintain current for sufficient joule heating of the wire, yet limit the amount of spatter during a short circuit clearance event, the level of current is dynamically adjusted such that at the time of the clearance event, the current is at a threshold level.

In some examples, power is provided from a switched mode power supply. Due to the physical limitations of such a power supply, the rate at which the current can be reduced is limited by the magnitude of the welding process voltage. In the case of a short circuit, that voltage is very low which corresponds to a low current decay rate.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuit and other ancillary circuit associated therewith.

As used herein, the term "pulse welding" includes welding with output power that is generally pulsed, at a controllable frequency, between a greater peak and a lesser background, and pulse welding is performed in an arc state.

As used herein, the term "periodic" and/or "cyclical" welding process and/or output includes welding output that may be characterized as a series of periods and/or cycles, wherein each cycle may be the same, similar or different.

As used herein, the term "wire feeder" includes the motor or mechanism that drives the wire, the mounting for the wire, and controls related thereto, and associated hardware and software.

As used herein, the term "bi-directional wire feeder" includes the motor or mechanism that drives the wire, the mounting for the wire, and controls related thereto, and associated hardware and software, the bi-directional wire feeder being capable of both advancing and reversing the wire. The bi-directional wire feeder can be used during a periodic and/or a cyclical welding process As used herein, the term "controller" or "control circuit" includes digital and/or analog circuit, discrete or integrated circuit, microprocessors, DSPs, FPGAs, etc., and/or software, hardware and firmware, located on one or more boards, used to control all or part of a welding-type system or a device such as a power supply, power source, engine or generator.

As used herein, a "circuit" or "circuitry" includes any analog and/or digital components, power and/or control elements, such as a microprocessor, digital signal processor (DSP), software, and the like, discrete and/or integrated components, or portions and/or combinations thereof.

As used herein, the term "energy storage device" is any device that stores energy, such as, for example, a battery, a supercapacitor, etc.

As used herein, the term "memory" includes volatile and non-volatile memory, and can be arrays, databases, lists, etc.

As used herein, the term "torch" or "welding-type tool" can include a hand-held or robotic welding torch, gun, or other device used to create the welding arc.

As used herein, the term "welding mode" or "welding operation" is the type of process or output used, such as CC, CV, pulse, MIG, TIG, spray, short circuit, etc.

As used herein, the term "boost converter" is a converter used in a circuit that boosts a voltage. For example, a boost converter can be a type of step-up converter, such as a DC-to-DC power converter that steps up voltage while stepping down current from its input (e.g., from the energy storage device) to its output (e.g., a load and/or attached power bus). It is a type of switched mode power supply.

As used herein, the term "buck converter" (e.g., a step-down converter) refers to a power converter which steps down voltage (e.g., while stepping up current) from its input to its output.

In disclosed examples, a welding-type system includes a welding-type power supply configured to generate output power for an arc welding process; and a controller. The controller is configured to calculate a representative duration of a plurality of short circuit events during the arc welding process, wherein each short circuit event includes a transitional phase, an intermediate phase, and an end phase. The controller calculates a sum of a duration of the transitional phase, a duration of the intermediate phase, and a duration of a ramp down time from a target current of the intermediate phase to a target current of the end phase associated with a given short circuit event. The controller controls the welding-type power supply to adjust a duration of the transitional phase, the intermediate phase or the ramp down time associated with the given short circuit event such that the sum is less than the representative duration.

In some examples, the welding-type system includes a controller, wherein the controller is configured to receive a signal from a sensor representing a characteristic of each short circuit event of the plurality of short circuit events during the arc welding process. In examples, the system characteristic includes at least one of a current, a duration, or a voltage.

In examples, the welding-type system includes a controller to measure the duration of the end phase of the given short circuit event based on one or more of the characteristics. In examples, a welding-type torch performs the arc welding process that includes a wire feeder configured to drive an electrode to a workpiece via the welding-type torch. In examples, the welding-type system includes a wire feeder, wherein the wire feeder is configured to control the electrode to advance or retract.

In some examples, a controller adjusts the duration of the ramp down during the end phase such that a short clearing event associated with the given short circuit event occurs at the target current of the end phase. In examples, the target current of the intermediate phase is greater than the target current of the end phase. In examples, the controller adjusts one of the target current of the intermediate phase or the target current of the end phase to reduce the ramp down time and/or the duration of the end phase. In some examples, a duration of the end phase is maintained at a level that is less than a predetermined value. In examples, a controller adjusts the duration of two or more of the transitional phase, the intermediate phase and the ramp down time associated with the given short circuit event.

In examples, the welding-type system includes a power supply, wherein power supply includes a switched mode power supply. In some examples, the ramp down rate is limited by a magnitude of a voltage associated with the output power from the switched mode power supply for the arc welding process. In examples, each short circuit event includes at least two intermediate phases, each intermediate phase including a respective target current level.

In some disclosed examples, the welding-type system includes a welding-type power supply configured to generate output power for an arc welding process and a welding torch that includes a wire feeder configured to drive an electrode to advance or retract during the arc welding process. The system also includes a controller configured to calculate a representative duration of a plurality of short circuit events during the arc welding process, wherein each short circuit event includes a transitional phase, an intermediate phase, and an end phase. The controller calculates a sum of a duration of the transitional phase, a duration of the intermediate phase, and a duration of a ramp down time from a target current of the intermediate phase to a target current of the end phase associated with a given short circuit event. The controller adjusts wire feed speed and/or acceleration of the electrode as the electrode advances or retracts during the transitional phase, the intermediate phase, or the end phase to adjust the time of the short circuit event such that the sum is less than the representative duration.

In examples, a controller increases acceleration as the electrode retracts during the transitional phase, the intermediate phase, or the end phase associated with the given short circuit event. In examples, the welding-type system includes a controller, wherein the controller is configured to decrease acceleration as the electrode advances during an arc event associated with the given short circuit event. In examples, the welding-type system includes a controller, wherein the controller is configured to adjust a length of the electrode that extends from the welding torch during the arc event to control arc length.

In some disclosed examples, the welding-type system includes a welding-type power supply configured to generate output power for an arc welding process; and a controller configured to calculate a representative duration of a plurality of arc events during the arc welding process, wherein each arc event includes a transitional phase, an intermediate phase, and an end phase. The controller calculates a sum of a duration of the transitional phase, a duration of the intermediate phase, and a duration of a ramp down time from a target current of the intermediate phase to a target current of the end phase of a given arc event. The controller adjusts a duration of one of the transitional phase, the intermediate phase or the ramp down time associated with the given arc event such that the sum is within a threshold range of the representative duration. Additionally or alternatively, a duration of the end phase is maintained at a level that is less than a predetermined value.

In examples, the welding-type system includes a welding-type power supply wherein the welding-type power supply includes a switched mode power supply to generate output power. In some examples, the welding-type system includes a controller, wherein the controller is configured to adjust the target current of the intermediate phase associated with the given arc event.

Figure 1:
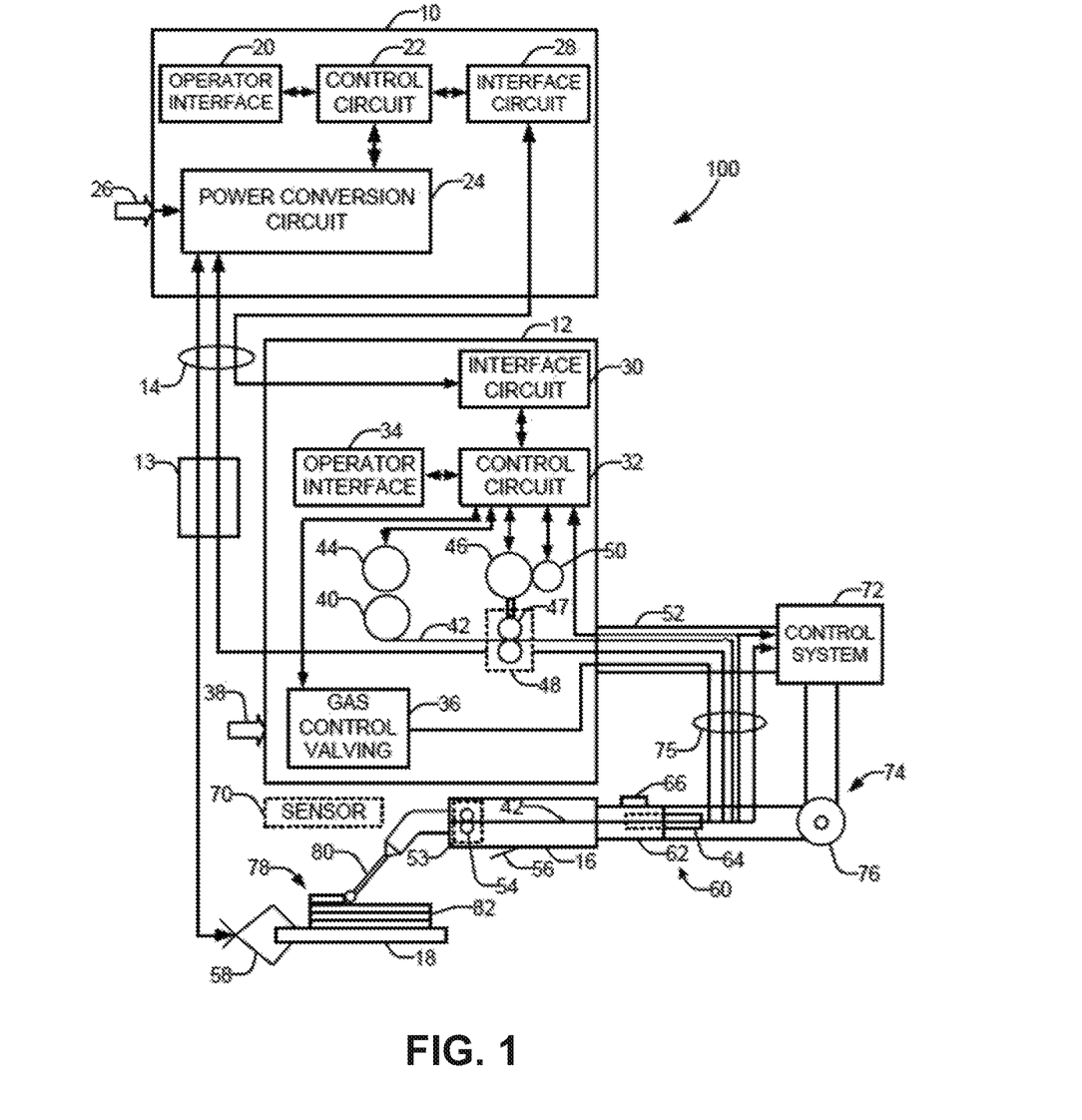
FIG. 1 is a diagrammatical representation of an exemplary arc welding system illustrating a power supply coupled to a wire feeder for performing controlled short circuit welding operations in accordance with aspects of the present techniques.

FIG. 1 illustrates an example arc welding-type system 100 for performing controlled short circuit (CSC) welding operations. As shown in the arc welding-type system of FIG. 1, a power supply 10 and a wire feeder 12 are coupled via conductors or conduits 14. In the illustrated example, the power supply 10 is separate from the wire feeder 12, such that the wire feeder may be positioned at some distance from the power supply near a welding location. However, in some examples the wire feeder may be integrated with the power supply 10. In such cases, the conduits 14 would be internal to the system. In examples in which the wire feeder 12 is separate from the power supply 10, terminals are typically provided on the power supply and on the wire feeder 12 to allow the conductors or conduits to be coupled to the systems so as to allow for power and gas to be provided to the wire feeder 12 from the power supply 10, and to allow data to be exchanged between the two devices.

The system 100 is configured to provide wire, power and shielding gas to a welding tool or welding torch 16. The tool 16 may be of many different types, and may allow for the feed of a welding wire 42 (e.g., an electrode wire) and gas to a location adjacent to a workpiece, substrate or platform 18. A second conductor is run to the welding workpiece so as to complete an electrical circuit between the power supply and the workpiece. In the context of additive manufacturing, the substrate 18 provides a foundation upon which a part 78 that includes layers 82 is to be formed by application of metal droplets 80. The disclosed controlled short circuit welding system 100 can employ a switch 13 to provide an alternative current path for one or more welding processes. For example, employing switch 13 provides an opportunity to adjust the current decay rate when transitioning from a high/peak current to a lower current value. In some examples, the reduced ramp down duration results in a shorter sum of phase times, such as between the intermediate and end phases in an arc and/or a short circuit event. In some examples, a duration of the end phase is maintained at a level that is less than a predetermined value (e.g., 1 millisecond).

The welding system 100 is configured for data settings to be selected by the operator and/or a welding sequence, such as via an operator interface 20 provided on the power supply 10. The operator interface 20 will typically be incorporated into a front faceplate of the power supply 10, and may allow for selection of settings such as the weld process, the type of wire to be used, voltage and current settings, and so forth. In particular, the system is configured to allow for welding with various steels, aluminums, or other welding wire that is channeled through the tool 16. Further, the system is configured to employ welding wires with a variety of cross-sectional geometries (e.g., circular, substantially flat, triangular, etc.). These weld settings are communicated to a control circuit 22 within the power supply. The system may be particularly adapted to implement welding regimes configured for certain electrode types.

Process instructions for the welding process can be provided via a weld sequence program, such as stored on a memory accessible to a processor/control circuit 22 associated with the power supply 10. In such a case, the sequencer can employ stored information (e.g., associated with a desired product configuration and/or process, including historical data), and/or customizable by a user. For instance, information associated with a particular design (e.g., thermal profiles associated with the part 78, material characteristics, system control parameters, etc.) corresponding to the part 78 can be stored in a memory and/or provided via a network interface. Thus, the information can be used to control operation of the system to facilitate formation of the part 78, such as by controlling a power output from the power supply 10, wire feeder motors 48, 54, etc.

The control circuit 22 operates to control generation of welding power output that is supplied to the welding wire 42 for carrying out the desired welding operation. In examples, the control circuit 22 may be adapted to regulate a pulsed MIG welding regime that promotes short circuit transfer of molten metal to the part 78, without adding excessive energy to the part 78 or the welding wire 42. In "short circuit" modes, droplets of molten material form on the welding wire 42 under the influence of heating by the welding arc, and these are periodically transferred to the part 78 by contact or short circuits between the welding wire 42 and droplets 80 and the part 78. Note that herein in this disclosure part 78 is sometimes referred to as workpiece, weldment or welding workpiece.

In this manner, the system and/or the control circuit 22 controls the welding of the part 78 by adjusting one or more welding process parameters of the system during the welding process. The welding process parameters may include, but are not limited to, wire feeder speed, wire feeder direction, travel speed, power output, process mode, deposition path, deposition sequence, torch angle, etc.

Additionally, a sensor(s) 70 can measure operational parameters associated with operation of the system (e.g., current, voltage, inductance, phase, impedance, power, inductance, wire feed speed, acceleration, orientation, position, etc.). The sensed operational characteristic (e.g., voltage, current, temperature, shape, speed, etc.) can be provided to the control circuit 22 or other controller (e.g., control circuit 32, a controller associated with the control system 72, etc.) to further control the welding process.

Power from the power supply is applied to the wire electrode 42, typically by a welding cable 52. Similarly, shielding gas is fed through the wire feeder and the welding cable 52. During welding operations, the welding wire 42 is advanced through a jacket of the welding cable 52 towards the tool 16. Within the tool 16, a second wire feeder motor 53 includes rollers 54 may be provided with an associated drive roll, which can be regulated to provide the desired wire feed speed and/or direction.

A control system 72 can be employed to regulate, for example, movement and position of the tool 16 in accordance with the control circuits 22, 32, as well as information from sensor(s) 70. In examples, the control system 72 may be in communication with the power supply 10, the wire feeder 12 and/or the tool 16 via one or more cables 75. Thus, power and/or information can be provided and/or exchanged via cable 75 to control the welding process. In particular, the control system 72 can employ one or more arms 74 having one or more actuators 76 (e.g., servo motors, joints, etc.). In this way, the control system 72 can command fine control of the attached tool 16 in six degrees of freedom during the welding operation, including travel speed, tool location, distance from the part 78, etc. The control system 72 may include one or more sensors to sense welding process parameters, which can be communicated with the control circuits 22, 32 to further facilitate formation of the part 78.

In some examples, the control circuits 22, 32 may provide a signal to the wire feeder 12, the power supply 10, and or the control system 72 to enable the welding process to be started and stopped in accordance with a particular application or welding process. That is, upon initiation of the process, gas flow may begin, wire may advance, and power may be applied to the welding cable 52 and through the tool 16 to the advancing welding wire 42. A workpiece cable and clamp 58 allow for closing an electrical circuit from the power supply through the welding torch, the electrode (wire), and the part 78 for maintaining the welding arc during the operation.

The present arc welding system allows for control of successive voltage and/or current levels and/or pulse durations based on previous current and duration measurements so as to control the promotion, occurrence, duration, and interruption of short circuit events between the weld puddle and the advancing wire electrode. In particular, current waveforms can be regulated based on one or more preceding short circuit events, or aspects of the short circuit events, such as its duration.

The control circuit 22 is coupled to power conversion circuit 24. This power conversion circuit 24 is adapted to create the output power, such as pulsed waveforms applied to the welding wire 42 at the tool 16. Various power conversion circuits may be employed, including choppers, boost circuit, buck circuit, inverters, converters, and so forth. The configuration of such circuit may be of types generally known in the art in and of itself. The power conversion circuit 24 is coupled to a source of electrical power as indicated by arrow 26. The power applied to the power conversion circuit 24 may originate in the power grid, although other sources of power may also be used, such as power generated by an engine-driven generator, batteries, fuel cells or other alternative sources. The power supply illustrated in FIG. 1 may also include an interface circuit 28 configured to allow the control circuit 22 to exchange signals with the wire feeder 12.

In this manner, the control circuit 22 (and/or the control circuit 32) is configured to control a short circuit event by controlling time adjustments of one or more phases of an arc event, a short circuit event, or a combination of both events, as disclosed herein. For example, the time adjustments can be based on a representative (e.g., calculated, determined, and/or historical average) duration of an arc event and/or a short event, to control the short clearance to occur at a desired current level.

Figure 3:
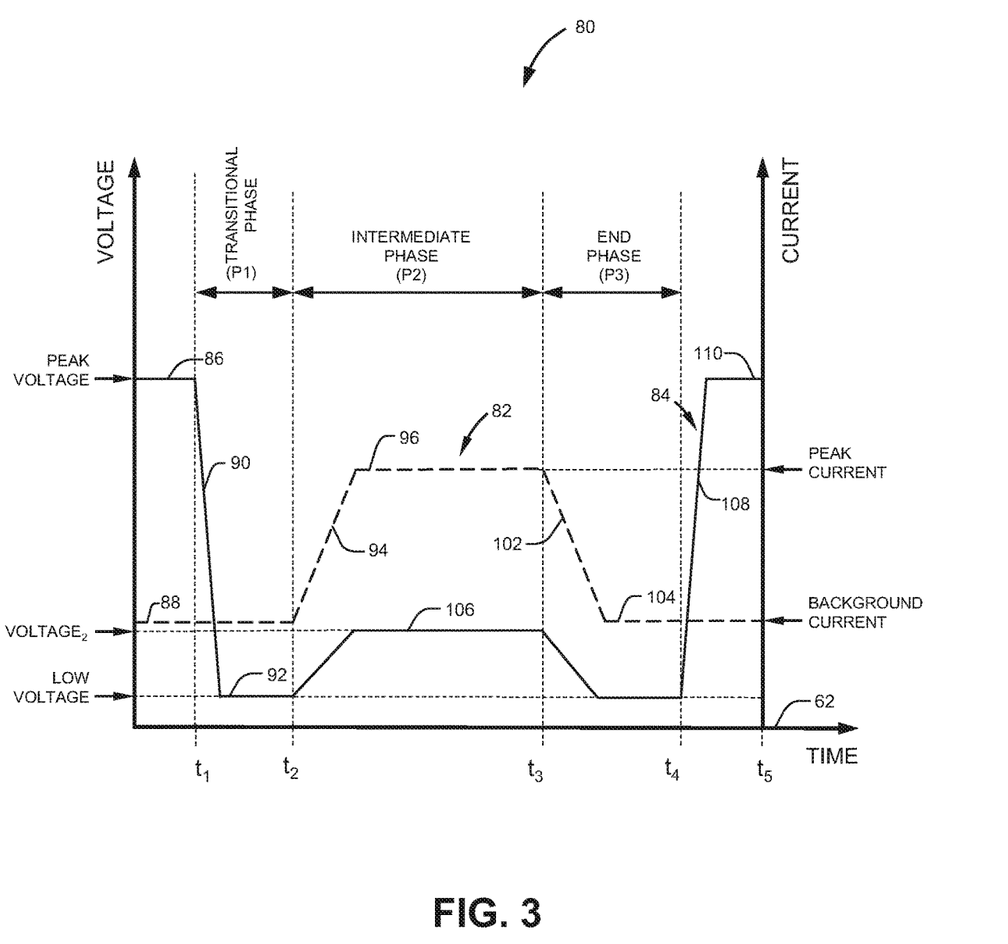
FIG. 3 is a graphical representation of an exemplary waveform for controlled short circuit welding in accordance with the present disclosure.
Figure 4:
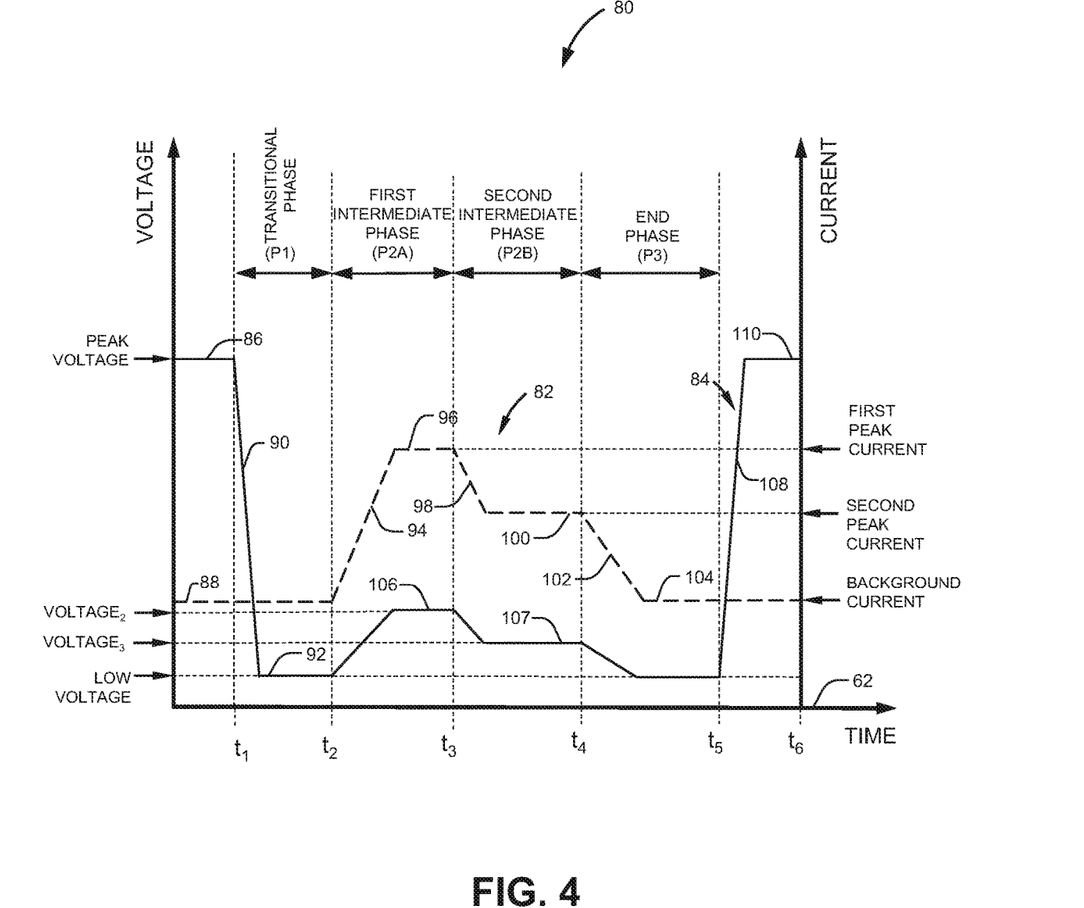
FIG. 4 is a graphical representation of another exemplary waveform for controlled short circuit welding in accordance with the present disclosure.
Figure 5:
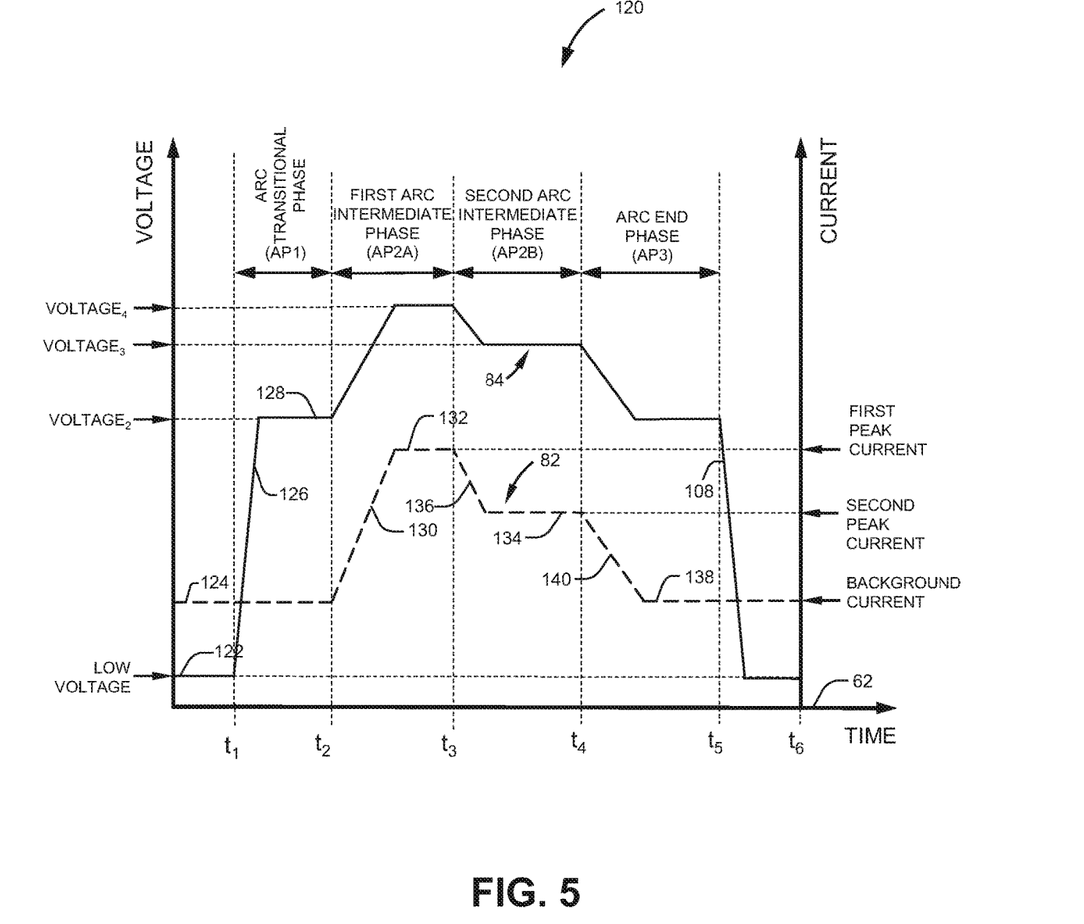
FIG. 5 is a graphical representation of yet another exemplary waveform for controlled short circuit welding in accordance with the present disclosure.

In some examples, one or more of the phases of the short circuit and arc events have an individually determined representative duration. Further, each phase may be associated with a desired target range of threshold durations. Thus, the control circuit can adjust a duration of one of the transitional phase, the intermediate phase, or end phase associated with the given event, such that the respective phase is within the range of threshold durations (e.g., stored in a memory device, input from a networked system, etc.). Additionally or alternatively, adjustments to a phase duration may be made to ensure the sum duration of all associated phases is within a threshold range of the representative duration, and/or a duration of the end phase is maintained at a level that is less than a predetermined value (e.g., 1 millisecond). The predetermined value can be a range of values or a selected threshold about the predetermined value, selected to provide for variations in a particular welding process (e.g., wire type, material type, torch type, etc.) and/or in response to commands (e.g., from an operator). Limiting the duration of the end phase can assist with Joule heating of the electrode wire 42, and/or facilitate total deposition of the electrode wire 42 by limiting the amount of time spent in the relatively low power end phases (as shown in FIGS. 3-5).

For example, the control circuit 22 can generate a short clearing prediction, which can be based on a process feedback variable (based on inputs from one or more sensors 70). If the current level is not decreased sufficiently prior to the short clearing event, the higher current level can result in spatter. To reduce the amount of spatter, the control circuit 22 can adjust a duration of one or more phases of the short circuit event such that the current is at the desired value when the short clears.

In some disclosed examples, the duration of a short circuit event can be described with respect to three or more distinct phases: a transitional phase, an intermediate phase, and an ending phase. Each phase has an independently determined target current, current ramp rate, and/or duration. Additionally, or alternatively, each phase can have an independently determined target wire feed speed and wire feed speed ramp rate (e.g., provided via coordination between the control circuit 22 and the control circuit 32) which regulates the speed and/or acceleration of the wire 42 as it advances and/or retracts to and/or from workpiece 18.

As disclosed herein, to avoid the short circuit clearance occurring at a current level above the background level, the controller 32 can employ a representative short circuit clearance event duration (e.g., an average) to adjust one or more characteristics (e.g., duration, current levels) of the short circuit phases to avoid clearance of the short circuit before the background current is achieved.

The wire feeder 12 may include a complimentary interface circuit 30 that is coupled to the interface circuit 28. In some examples, multi-pin interfaces may be provided on both components and a multi-conductor cable run between the interface circuit to allow for such information as wire feed speeds, processes, selected currents, voltages or power levels, and so forth to be set on either the power supply 10, the wire feeder 12, or both.

The wire feeder 12 also may include control circuit 32 coupled to the interface circuit 30. As described below, the control circuit 32 allows for wire feed speeds to be controlled in accordance with operator selections or stored sequence instructions, and permits these settings to be fed back to the power supply via the interface circuit. The control circuit 32 is coupled to an operator interface 34 on the wire feeder that allows selection of one or more welding parameters, particularly wire feed speed. The operator interface may also allow for selection of such weld parameters as the process, the type of wire utilized, current, voltage or power settings, and so forth. The control circuit 32 may also be coupled to gas control valving 36 that regulates the flow of shielding gas to the torch. In general, such gas is provided at the time of welding, and may be turned on immediately preceding the weld and for a short time following the weld. The gas applied to the gas control valving 36 may be provided in the form of pressurized bottles, as represented by reference numeral 38.

The wire feeder 12 includes components for feeding wire to the welding tool 16 and thereby to the welding application, under the control of control circuit 32. For example, one or more spools of welding wire 40 are housed in the wire feeder. Welding wire 42 is unspooled from the spools and is progressively fed to the tool 16. The spool may be associated with a clutch 44 that disengages the spool when wire is to be fed to the tool. The clutch 44 may also be regulated to maintain a minimum friction level to avoid free spinning of the spool 40. The first wire feeder motor 46 may be provided within a housing 48 that engages with wire feed rollers 47 to push wire from the wire feeder 12 towards the tool 16.

In the example of FIG. 1, a moveable buffer 60 can include a first portion 62 and a second portion 64, where at least one of the first and second portions are configured to move relative the other portion in response to a change in the amount of welding wire 42 between a first wire feeder motor 46 and a second wire feeder motor 53. A sensor 66 (e.g., one or more sensors) is configured to sense relative movement or displacement between the first and second portions and provide sensor data to control circuit (e.g., control circuit 22, 32) to adjust a speed and/or direction of the welding wire 42 in response.

In practice, at least one of the rollers 47 is mechanically coupled to the motor and is rotated by the motor to drive the wire from the wire feeder, while the mating roller is biased towards the wire to maintain good contact between the two rollers and the wire. Some systems may include multiple rollers of this type. A tachometer 50 or other sensor may be provided for detecting the speed of the first wire feeder motor 46, the rollers 47, or any other associated component so as to provide an indication of the actual wire feed speed. Signals from the tachometer are fed back to the control circuit 32, such as for continued or periodic monitoring, calibration, etc. In some examples, the system includes a wire spool motor for rotating the wire-feeding device, which can be similarly adjusted to increase or decrease the amount of wire between wire feeder motors.

In some examples, the wire feeder 12 can be configured to reverse the direction of the welding wire 42 (i.e. a bi-directional wire feeder). Moreover, although described as operating with two wire feeders and/or wire feeder motors (e.g., wire feeder motors 46 and 53), the system can operate with a single wire feeding unit to advance and/or reverse wire during welding operations (e.g., formation of a part 78). Additionally, or alternatively, in some examples, one wire feeder may be configured to advance the wire 42 while another wire feeder is configured to reverse the direction of the wire. In this example, one or more control circuit (e.g., control circuits 22, 32) coordinates operation of the two wire feeders to implement a controlled short circuit welding process in a welding system, as disclosed herein.

In disclosed examples, the control circuit (e.g., control circuits 22, 32) receives a feedback signal corresponding to a contact force on the wire 42 from one or more drive rolls 47, 54. The control circuit then commands an actuator and/or mechanical device to adjust the contact force in response to the contact force falling outside a range of threshold contact force values. For instance, the control circuit (e.g., control circuits 22, 32) may command the actuator to adjust the contact force automatically, via a motor (e.g., motor 46), or an associated clutch, solenoid, piezo-electric device, and/or other electromechanical. The result is an adjustment in the contact force on the welding wire 42 from the one or more drive rolls 47, 54. For example, the actuator and/or mechanical device may cause a change in the position of the drive rolls, such as increasing or decreasing the distance between drive rolls through which the wire is fed. Additionally, or alternatively, a position of the drive roll can be adjusted to change an area on the surface of the drive roll in contact with the wire.

Other system arrangements and input schemes may also be implemented. For example, the welding wire may be fed from a bulk storage container (e.g., a drum) or from one or more spools outside of the wire feeder. Similarly, the wire may be fed from a "spool gun," in which the spool is mounted on or near the welding torch. As noted herein, the wire feed speed settings may be input via the operator input 34 on the wire feeder or on the operator interface 20 of the power supply, or both. In systems having wire feed speed adjustments on the welding torch, this may be the input used for the setting.

Although described with respect to an arc welding-type system, the disclosed system may be implemented in conjunction with a variety of technologies to conduct various types of welding processes.

Thus, as described with respect to FIG. 1, the welding-type system 100 can include a welding-type power source 10 configured to generate output power for an arc welding process, for example, to power one or more of the wire feeder 12, the robotic system 74, perform arc welding via tool 16, etc. The wire feeder 12 may be a bi-directional wire feeder configured to advance or retract the wire 42 to or from the workpiece 18. Sensors 70 measure one or more welding process parameters, and provide such measurements to a controller (e.g., control circuit 22, control circuit 32, control system 72, etc.), which commands operation of the, for instance, in response to one or more welding process parameters exceeding one or more threshold values corresponding to a short clearance event during a welding/additive manufacturing operation.

Figure 2:
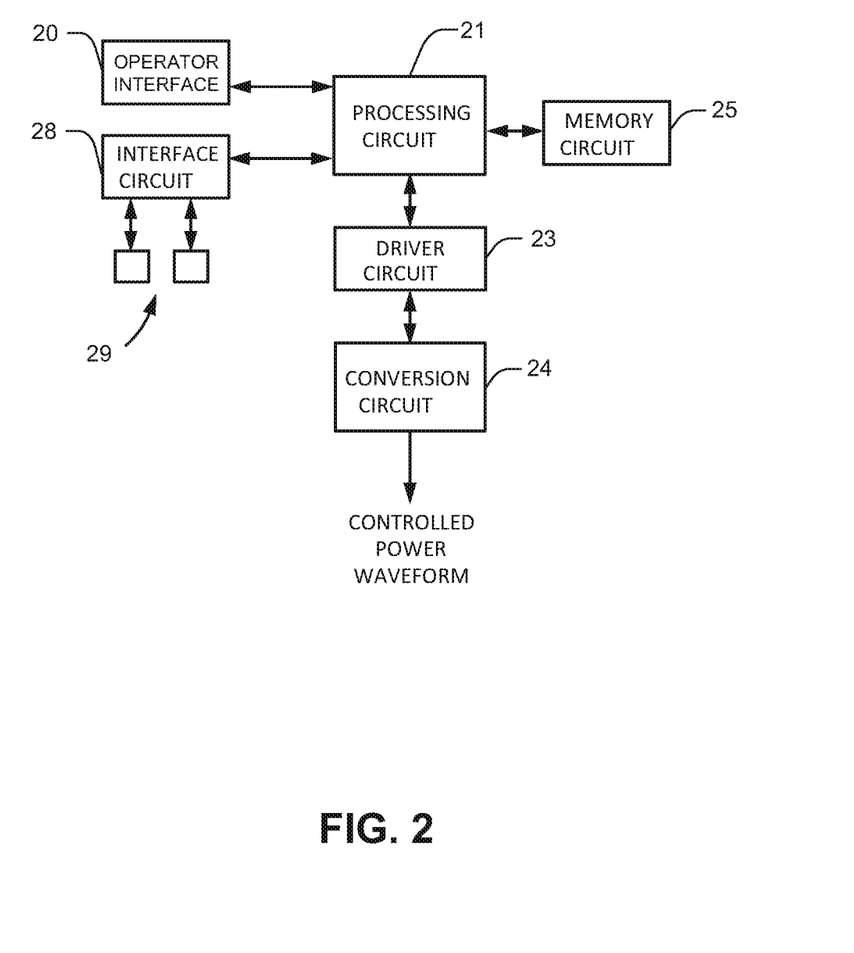
FIG. 2 is a graphical representation of exemplary control circuitry components for a welding power supply of the type shown in FIG. 1.

FIG. 2 illustrates an example control circuit configured to function in a system of the type similar to control circuit 22 illustrated in FIG. 1. The overall circuitry includes the operator interface 20 discussed above and interface circuitry 28 for communication of parameters to and from downstream components (represented generally by reference numeral 29) such as a wire feeder 12, a welding torch 16, and various sensors and/or actuators. The circuit includes processing circuit 21 which itself may include one or more application-specific or general purpose processors, configured to carry out welding regimes, make computations for waveforms implemented in welding regimes, etc. The processing circuit 21 is associated with driver circuit 23, which converts control signals from the processing to drive signals that are applied to power electronic switches of the power conversion circuit 24. In general, the driver circuit 23 reacts to control signals from the processing circuit 21 to allow the power conversion circuit 24 to generate controlled waveforms for pulsed welding regimes of the type disclosed herein. The processing circuit 21 will also be associated with memory circuitry 25 which may consist of one or more types of permanent and temporary data storage, such as for providing the welding regimes implemented, storing welding parameters, storing weld settings, storing error logs, etc.

FIG. 3 illustrates an exemplary graphical representation 80 of a current waveform 82 and a voltage waveform 84 during phases of a short circuit event, as described herein.

For example, the waveforms 82 and/or 84 can be generated by control circuits 22 and/or 32 to command the power output from the welding power supply 12, as disclosed herein. Furthermore, the commands can be generated by one or more remote computing platforms, such as via communicated via one or more data channels (e.g., via a web interface, networked computer, etc.).

As shown, the process alternates from an arc event to a short circuit event. Thus, at voltage 86 and at current 88, the process approaches a transition from a preceding arc event into the short circuit event at time $t_1$, as illustrated in FIG. 3. Although current level 88 is illustrated as corresponding to a background current level, during the transition phase P1, the current may be adjusted as desired (e.g. to regulate heat input). As the electrode wire 42 makes contact with the workpiece 18, the voltage drops rapidly, as shown by reference numeral 90, to a low voltage level 92. As the voltage drops during a transitional phase (P1), the arc event transitions to the short circuit event, and the current level rises 94 to a predetermined peak current level 96 associated with an intermediate short circuit phase (P2).

Additionally, as depicted in FIG. 4 and described further below, a second intermediate phase (P2B) can be included, in which case each phase includes a target current level, such as first peak current level 96 associated with the first intermediate phase (P2A) and second peak current level 100 associated with the second intermediate phase (P2B).

Referring back to FIG. 3, the ramp down time from the previous current level 96, represented by reference numeral 102, may be defined by the time needed to transition between target current levels. Thus, an adjustment to one or both target current levels (e.g., peak current, background current, etc.) can limit the duration of a transition between the two current levels. Additionally or alternatively, the ramp down rate 102 may correspond to one or more characteristics of the power source (e.g. switched mode power supply), characteristics of the cable(s) 75, and/or may be adjusted by a user and/or sequencer.

During the intermediate phase (P2), the short circuit event progresses to a point where transfer of the molten ball is imminent. For the short circuit clearance to occur the current level is commanded to decrease from the peak current level 96 to a lower (e.g., background) current level 104 between time $t_3$ and $t_4$. Again, the current decay rate, represented as 102, can be limited by a variety of factors. Once the background current level 104 is achieved, the short circuit clearance occurs in the end phase (P3) of the short circuit event. As disclosed herein, a duration of the end phase can be maintained at a level that is less than a predetermined value (e.g., 1 millisecond). Such values can be programmed, set by an operator, stored in a memory device, provided via a remote computing platform, informed by historical data, or provided from another suitable source. At time $t_4$, the cycle advances to the arc event stage until the cycle repeats itself. As shown, the voltage level increases at a ramp rate represented by reference numeral 108 from a low level 92 to a peak voltage level 110 sufficient to sustain an arc.

As shown in FIGS. 3 and 4, the low voltage level may be maintained at a single level (e.g., low voltage 92) or may be adjusted and/or effected by the control of the current level to a second voltage level 106 or a third voltage level 107. As illustrated, the short circuit event of FIG. 4 includes a first intermediate phase (P2A) and a second intermediate phase (P2B). However, a single intermediate phase, or three or more intermediate phases may be employed in accordance with the present disclosure. Furthermore, the transition between phases can be initiated by commanding different current levels, with voltage levels responding to the current commands.

FIG. 4 illustrates a graphical representation 80 of a current waveform 82 and a voltage waveform 84 during phases of a short circuit event, as described herein. As shown, the process is cyclical, and transitions from an arc event to a short circuit event at time $t_1$, and from the short circuit event to the arc event at time $t_5$. Thus, at voltage 86 and at current 88, the process approaches a transition from a preceding arc event into the short circuit event illustrated in FIG. 4. As the electrode makes contact with the workpiece, the voltage drops rapidly, as shown by reference numeral 90, to a low voltage level 92. As shown, the voltage drops during a transitional phase (P1) as the arc event transitions to the short circuit event. The current level rises 94 to a predetermined peak current level 96 associated with a first intermediate short circuit phase (P2A). Additionally, a second intermediate phase (P2B) can be included. As described herein, each phase includes a target current level, such as second peak current level 100 associated with the second intermediate phase (P2B). The time between transition from the first peak current level 96 to second peak current level 100, represented as element 98, may be limited by the difference between target current levels. Thus, an adjustment to one or both target current levels (e.g., first peak current, second peak current, background current, etc.) can limit the duration of a transition between any two current levels. Additionally or alternatively, the ramp down rates 98, 102 may correspond to one or more characteristics of the power source, characteristics of the cable, and/or may be adjusted by a user and/or sequencer.

During the intermediate phases (P2A-B), the short circuit event progresses to a point where transfer of the molten ball is imminent. For the short circuit clearance to occur at a lower current level, the current level decreases from the second peak current level 100 to a lower (e.g., background) current level 104. Again, the current decay rate, represented as 102, can be limited by a variety of factors. Once the background current level 104 is achieved, the short circuit clearance signals completion of the short circuit event following the end phase P3 at time $t_5$. The cycle advances to the arc event stage until the cycle repeats itself. As shown, the voltage level increases 108 from a low level to a peak voltage level 110 sufficient to sustain an arc.

FIG. 5 illustrates a graphical representation 120 of a current waveform 82 and a voltage waveform 84 during phases of an arc event during the cyclical welding process, as described herein. As shown, the process transitions from a short circuit event to an arc event at time $t_1$, and from the arc event to the short circuit event at time $t_5$. Thus, at voltage 122 and at current 124, the process approaches a transition from a preceding short circuit event into the arc event illustrated in FIG. 5. As the electrode retracts from the workpiece, the voltage increases rapidly as an arc is struck, as shown by reference numeral 126, to a second voltage level 128. As shown, the voltage rises during an arc transitional phase (API) as the short circuit event transitions to the arc event.

The current level is commanded to rise 130 to a first peak current level 132 associated with a first arc intermediate phase (AP2A). Additionally, a second arc intermediate phase (AP2B) can be included. As described herein, each phase includes a target current level, such as first peak current level 132 and second peak current level 134 associated with the second arc intermediate phase (AP2B). The time between transitions from the first peak current level 132 to second peak current level 134, represented as element 136, may be limited by the difference between different target current levels. Thus, an adjustment to one or both target current levels (e.g., first peak current, second peak current, background current, etc.) can limit the duration of a transition between any two current levels. Additionally or alternatively, as disclosed herein, the ramp down rates may correspond to one or more characteristics of the power source, characteristics of the cable, and/or may be adjusted by a user and/or sequencer.

During the intermediate phases (P2A-B), the arc event progresses to a point where a short circuit is imminent. Prior to entrance into the short circuit phases, the current level decreases from the second peak current level 134 to a lower (e.g., background) current level 138. Again, the current decay rate, represented as 140, can be limited by a variety of factors. Once the background current level 138 is achieved, the arc event ends at $t_5$, signaling entrance into the short circuit event. The cycle advances to the short circuit event stage until the cycle repeats itself. As shown, the voltage level may respond to the commanded/target current levels during the arc event phases, and finally decrease from the voltage level in the arc end phase AP3 (e.g., voltage 128 or a responsive voltage level) to a low level (e.g., voltage 122) at the onset of the short circuit. Additionally or alternatively, similar to an end phases as described with respect to a short circuit event, a duration of the arc end phase AP3 can be maintained at a level that is less than a predetermined value (e.g., 1 millisecond). As illustrated, the arc event of FIG. 5 includes a first arc intermediate phase (AP2A) and a second arc intermediate phase (AP2B). However, a single intermediate phase, or three or more intermediate phases may be employed in accordance with the present disclosure.

Figure 6:
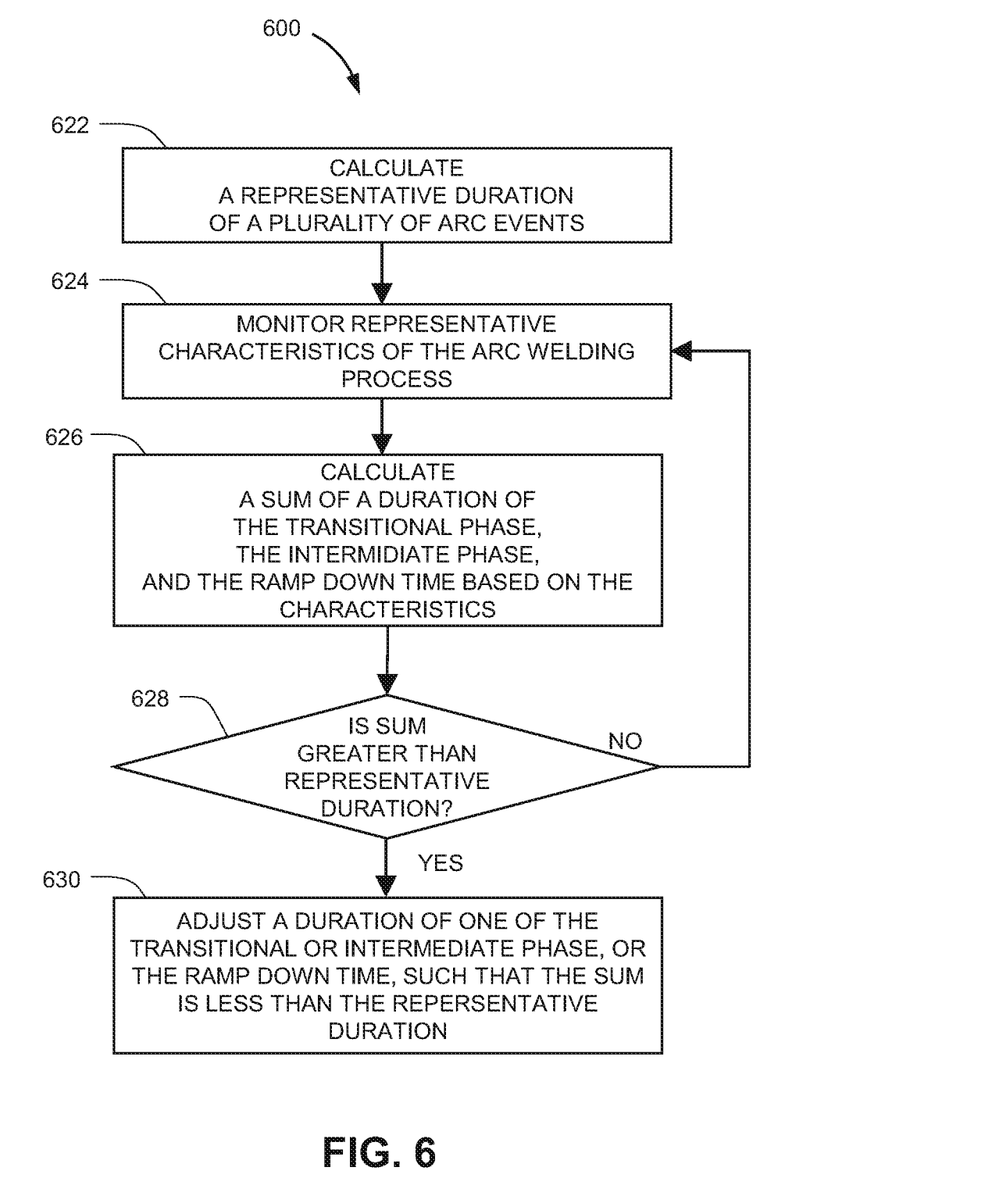
FIG. 6 is a flow chart illustrating a welding regime in accordance with the present disclosure.

FIG. 6 is a method 600 of a welding-type power supply configured to generate output power for an arc welding process. In block 622, a controller (e.g., control circuit 22, 32) is configured to calculate a representative duration of a plurality of arc events. For example, each arc event includes a transitional phase, an intermediate phase, and an end phase, similar to short circuit events. In block 624, one or more characteristics of the arc welding process are monitored (e.g., via one or more sensors 70).

In block 626, based on the data from the sensors, the controller calculates a sum of a duration of the transitional phase, a duration of the intermediate phase, and a duration of a ramp down time from a target current of the intermediate phase to a target current of the end phase of an arc event. In block 628, the controller compares the calculated sum of the duration (and/or each individual phase duration) and compares the sum to the representative duration (and/or a representative duration for each individual phase). If the sum is not greater than the representative duration, the process returns to block 624 to continue monitoring characteristics of the arc welding process.

If the sum is greater than the representative duration, the process proceeds to block 630, where the controller adjusts a duration of one of the transitional phase, the intermediate phase or the ramp down time such that the sum is within a threshold range of the representative duration. As a result, the short circuit event is calculated to commence at a predetermined current level selected to control the timing and energy levels associated with the short circuit clearance event.

The present methods and systems may be realized in hardware, software, and/or a combination of hardware and software. Example implementations include an application specific integrated circuit and/or a programmable control circuit.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type system, comprising:
a welding-type power supply configured to generate output power for an arc welding process; and
a controller configured to:
calculate a representative duration of a plurality of short circuit events during the arc welding process, wherein each short circuit event transitions from an arc event, and each short circuit event comprises a transitional phase that includes a drop in voltage from a peak voltage level to a first low voltage level corresponding to a short circuit, followed by an intermediate phase initiated by current rising from a first background current level to a target current level and an increase in voltage to an intermediate voltage level that is less than the peak voltage level, and then followed by an end phase that includes a drop in voltage to a second low voltage level and a drop in current to a second background current level prior to transitioning to another arc event by maintaining the background current level while the voltage increases;

calculate a sum of a duration of the transitional phase, a duration of the intermediate phase, and a duration of a ramp down time during the end phase from a target current of the intermediate phase to a target current of the end phase associated with a given short circuit event;

select a predetermined value for a duration of the end phase; and control the welding-type power supply to adjust one of a duration of the transitional phase, the intermediate phase or the ramp down time associated with the given short circuit event such that the sum is within a threshold range of the representative duration, and to maintain the duration of the end phase less than the predetermined value.

2. The system as defined in claim 1, wherein the controller is configured to receive a signal from a sensor representing a characteristic of each short circuit event of the plurality of short circuit events during the arc welding process.

3. The system as defined in claim 2, wherein the characteristic comprises at least one of a current, a duration, or a voltage.

4. The system as defined in claim 3, wherein the controller is configured to measure the duration of the end phase of the given short circuit event based on one or more of the characteristics.

5. The system as defined in claim 2, further comprising a welding-type torch to perform the arc welding process that includes a wire feeder configured to drive an electrode to a workpiece via the welding-type torch.

6. The system as defined in claim 5, wherein the wire feeder is configured to control the electrode to advance or retract.

7. The system as defined in claim 1, wherein the controller is configured to adjust the duration of the end phase such that a short clearing event associated with the given short circuit event occurs at the target current of the end phase.

8. The system as defined in claim 1, wherein the target current of the intermediate phase is greater than the target current of the end phase.

9. The system as defined in claim 1, wherein the controller is configured to adjust one of the target current of the intermediate phase or the target current of the end phase to reduce the ramp down time.

10. The system as defined in claim 1, wherein the controller is configured to adjust the duration of two or more of the transitional phase, the intermediate phase and the ramp down time associated with the given short circuit event.

11. The system as defined in claim 1, wherein the welding-type power supply comprises a switched mode power supply.

12. The system as defined in claim 11, wherein the ramp down rate is limited by a magnitude of a voltage associated with the output power from the switched mode power supply for the arc welding process.

13. The system as defined in claim 1, wherein each short circuit event comprises at least two intermediate phases, each intermediate phase including a respective target current level.

14. A welding-type system, comprising:
a welding-type power supply configured to generate output power for an arc welding process;
a welding torch that includes a wire feeder configured to drive an electrode to advance or retract during the arc welding process; and
a controller configured to:

calculate a representative duration of a plurality of short circuit events during the arc welding process, wherein each short circuit event comprises a transitional phase from an arc event that includes a drop in voltage from a first voltage level to a second voltage level corresponding to a short circuit, followed by a first intermediate phase initiated by current rising from a first background current to a first target current level and voltage rising to a third voltage level that is less than the first voltage, followed by a second intermediate phase that includes current dropping to a second target current level that is less than the first target current level and voltage dropping to a fourth voltage level that is less than the third voltage level, and then followed by an end phase that comprises a first portion including current ramping down from the second target current level of the second intermediate phase to a second background current level and a second portion comprising maintaining the second background current level prior to transitioning to another arc event;

calculate a sum of a duration of the transitional phase, a duration of the intermediate phase, and a duration of a ramp down time during the end phase from a target current of the intermediate phase to a target current of the end phase associated with a given short circuit event;

adjust a wire feed speed of the electrode as the electrode advances or retracts during the transitional phase, the intermediate phase, or the end phase to increase the time of the short circuit event such that the sum is within the threshold range of the representative duration; and maintain a sum duration of a first duration of the first portion of the end phase and a second duration of the second portion of the end phase less than a predetermined value.

15. The system as defined in claim 14, wherein the controller is configured to increase acceleration as the electrode retracts during the transitional phase, the intermediate phase, or the end phase associated with the given short circuit event.

16. The system as defined in claim 14, wherein the controller is configured to decrease acceleration as the electrode advances during an arc event associated with the given short circuit event.

17. The system as defined in claim 16, wherein the controller is configured to adjust a length of the electrode that extends from the welding torch during the arc event to control arc length.

18. A welding-type system, comprising:
a welding-type power supply configured to generate output power for an arc welding process; and
a controller configured to:

calculate a representative duration of a plurality of arc events during the arc welding process, wherein each arc event comprises:
a transitional phase that includes an increase in voltage from a first voltage level to a second voltage level and current reaching a first background current level,
a first intermediate phase that follows the transitional phase, the first intermediate phase including current rising from the first background current level to a first peak current and voltage increasing from the second voltage level to a third voltage level, a second intermediate phase that follows the first intermediate phase, the second intermediate phase including current dropping to a second peak current and voltage dropping to a fourth voltage level, and an end phase following the second intermediate phase that is followed by a short circuit, the end phase including voltage dropping to a fifth voltage level and current dropping to a second background current level;

calculate a sum of a duration of the transitional phase, a duration of the first intermediate phase, a duration of the second intermediate phase, and a duration of a ramp down time during the end phase from the second peak current of the second intermediate phase to the second background current level of the end phase of a given arc event, wherein the second background current level of the end phase is maintained as the arc welding process transitions to a short circuit event;

adjust a duration of one of the transitional phase, the first intermediate phase, the second intermediate phase, or the ramp down time associated with the given arc event such that the sum is within a threshold range of the representative duration; and maintain a duration of the end phase less than a predetermined value.

19. The system as defined in claim 18, wherein the welding-type power supply comprises a switched mode power supply to generate output power.

20. The system as defined in claim 18, wherein the controller is configured to adjust the peak current of the intermediate phase associated with the given arc event.

* * * * *